United States Patent
Chalfant, III

(10) Patent No.: US 9,255,800 B2
(45) Date of Patent: Feb. 9, 2016

(54) SPACE VEHICLE AND GUIDANCE AND CONTROL SYSTEM FOR SAME

(71) Applicant: Space Photonics, Inc., Fayetteville, AR (US)

(72) Inventor: Charles H. Chalfant, III, Fayetteville, AR (US)

(73) Assignee: Space Photonics, Inc., Fayetteville, AR (US)

(*) Notice: Subject to any disclaimer, the term of this patent is extended or adjusted under 35 U.S.C. 154(b) by 331 days.

(21) Appl. No.: 14/211,720

(22) Filed: Mar. 14, 2014

(65) Prior Publication Data

US 2014/0263845 A1    Sep. 18, 2014

Related U.S. Application Data

(60) Provisional application No. 61/789,938, filed on Mar. 15, 2013.

(51) Int. Cl.
*B64G 1/28*    (2006.01)
*G01C 19/00*    (2013.01)

(52) U.S. Cl.
CPC ............... *G01C 19/00* (2013.01); *B64G 1/286* (2013.01)

(58) Field of Classification Search
CPC .......... B64G 1/28; B64G 1/286; B64G 1/288; B64G 2001/245
See application file for complete search history.

(56) References Cited

U.S. PATENT DOCUMENTS

| | | | | |
|---|---|---|---|---|
| 5,875,676 A | * | 3/1999 | Bailey | B64G 1/286 244/165 |
| 6,154,691 A | * | 11/2000 | Bailey | B64G 1/286 244/165 |
| 7,152,495 B2 | * | 12/2006 | Peck | B64G 1/286 244/165 |
| 8,014,911 B2 | * | 9/2011 | Hamilton | B64G 1/286 244/165 |
| 8,346,538 B2 | * | 1/2013 | Kreider | B64G 1/286 704/4 |

* cited by examiner

*Primary Examiner* — Philip J Bonzell

(57) ABSTRACT

A space vehicle has a frame with a configuration of fiber optic gyroscopes (FOGs) and control moment gyroscopes (CMGs) at the outer perimeter of the frame. The FOGs and CMGs provide guidance and control for the space vehicle. This arrangement results in the largest possible FOG and CMG diameters, and therefore yielding the highest signal sensitivities and precision inertial control of vehicle orientation and pointing. Because the configuration places these guidance and control system components at the perimeter of the vehicle, it also provides a platform for multi-aperture signal channels in the interior of the vehicle by freeing up volume within the vehicle.

18 Claims, 4 Drawing Sheets

SPACE VEHICLE AND GUIDANCE AND CONTROL SYSTEM FOR SAME

CROSS-REFERENCE TO RELATED APPLICATIONS

This application claims the benefit of U.S. provisional patent application No. 61/789,938, entitled "Spherical Satellite System," filed on Mar. 15, 2013. Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to the field of space vehicle systems and subsystems used for inertial measurements, guidance and control. Specifically, the present invention relates to such systems and subsystems employing fiber optic gyroscopes (FOGs) and control moment gyroscopes (CMGs). FOGs perform a function similar to a mechanical gyroscope, but operate based on the interference of light that passes through a coil of optical fiber. Because they require no moving parts, they are generally considered more reliable than mechanical gyroscopes and are commonly used in space applications as a result. CMGs are attitude control devices that consist of a spinning rotor and one or more motorized gimbals that tilt the rotor's angular momentum, thereby causing a torque that rotates the spacecraft.

It has historically been assumed in space vehicle design that all the antenna communications systems be placed externally and configured to provide signal paths into the satellite via cables, with the electronics systems occupying various subsystems within the vehicle. These electronics systems thus take up valuable space within the space vehicle. Most three-axis FOG inertial measurement units (IMU) consist of a single, standalone package containing all three fiber coils placed orthogonally, thereby providing three axes of rotation rate measurements. CMG torqueing systems for space vehicles also typically occupy standalone volumes dedicated to providing torque, often configured with several solid heavy metal torqueing wheels; these are spun-up and maintained at various rotational speeds and are rotated to apply torque in varying conditions, thus providing various torque values to the space vehicle for orientation. A key but previously unrecognized limitation to these standalone subsystem packaging paradigms is that the diameters are restricted to only the space provided solely for the FOG 3-axis IMUs and separate volumes for the CMG wheels and electronics. In addition, the inventor hereof has recognized that placing these components nearer to the center of the space vehicle reduces their sensitivity.

Given the great cost of launching satellites and other space vehicles into space and the premium attached to available volume within a space vehicle, a more efficient way to configure systems and subsystems associated with a space vehicle or satellite, particularly systems and subsystems related to FOGs and CMGs, would be highly desirable. In addition, a configuration of FOGs and CMGs that maximized the sensitivity of these instruments would also be highly desirable.

References mentioned in this background section are not admitted to be prior art with respect to the present invention.

BRIEF SUMMARY OF THE INVENTION

The present invention is directed to a new configuration of FOGs and CMGs specifically placed into the outermost perimeter of the space vehicle, thereby providing the largest possible FOG and CMG diameters, and therefore yielding the highest signal sensitivities and precision inertial control of vehicle orientation and pointing. Both FOGs and CMGs provide better precision for their measurements in proportion to their diameters; a larger diameter improves the precision of the rotation rate, measured in degrees per second or radians per second, of the FOG, and a greater amount of space vehicle torque with larger diameter CMGs. At the same time, this new configuration provides a platform for other components, including multi-aperture signal channels, by freeing up volume within the space vehicle.

In certain embodiments, three separate FOG fiber coils are placed orthogonally and normal to the space vehicles' inertial reference frame's orthogonally defined axes, X, Y, and Z, thereby providing rotation rates about each axis. Each fiber coil is configured into the outer perimeter of the space vehicle, and thus uses a maximum possible diameter for the best possible measurement sensitivity. In these embodiments, a common circular mechanical structure for each orthogonal fiber coil and the CMGs is employed comprising solid heavy metal annular rings. The annular ring CMGs and FOGs are packaged directly adjacent to one another in the three orthogonal ring mechanical structures. While providing the best possible precision by occupying the space vehicle's outer perimeter, this also provides an open inner volume for signal processing transmitters, receivers, optical imaging sensors, or other components. These embodiments therefore provide single-axis FOG & CMG navigation and guidance components contained in a common annular ring package, with the signal processing electronics adjacent to each of the three orthogonal rings.

These and other features, objects and advantages of the present invention will become better understood from a consideration of the following detailed description of the preferred embodiments and appended claims in conjunction with the drawings as described following:

DETAILED DESCRIPTION OF THE PREFERRED EMBODIMENT(S)

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

A preferred operational embodiment of the present invention consists of three FOGs with circular fiber coils wrapped and embedded orthogonally in the outer diameter of a spherical structure, with respect to the spacecraft's X-Y-Z coordinates. The three rotational measurements are electronically coupled continuously to the inertial navigation and guidance system, consisting of CMGs and closed-loop electronics, via direct and short signal paths. Three orthogonal rings with the co-planar CMGs and FOGs in close proximity can provide a full range of rotational motion for vehicle orientation and pointing. This also provides the inner volume of the vehicle for optical signal processing of images and sensors, and free space optical communications (FSOC) channels, all with entrance and exit apertures occupying opposite inner sides of the vehicle. The first optical element at each entrance/exit is a wide field lens through the middle of the vehicle sphere, with a continuous optical path toward the opposite side of the sphere. A focal length equal to the diameter of the sphere terminated at the opposing surface would be used for shorter distance free space optical (FSO) links, while a longer focal length telescope could be used by placing a concave reflecting mirror at the opposing side, as in a Cassegrainian configuration, for longer distance FSO links. This configuration is ideal for using FSO beam pointing and tracking at the focal plane of these telescopes, as set forth in U.S. Pat. Nos. 7,612,329, 7,612,317, 7,224,508, and 8,160,452, which are incorporated by reference herein. The light signals use telescope optical designs configured into the vehicle structure using the empty inner volume for the telescope's optical signal paths and focus onto the imaging/sensor array (for example, CCD, visible, IR, and cooled). A fiber optic data handling network is embedded into the FOG fiber optic coils, using optical taps and splitters for inserting and removing the optical data signals. The fiber optic data handling networks consists of high-speed optical channels for relays and processing, and command, telemetry, and control (CT&C) networks. Separating the optical data channels from the FOG signals is straightforward using optical electronic filtering, as well known in the art.

Figure 1:
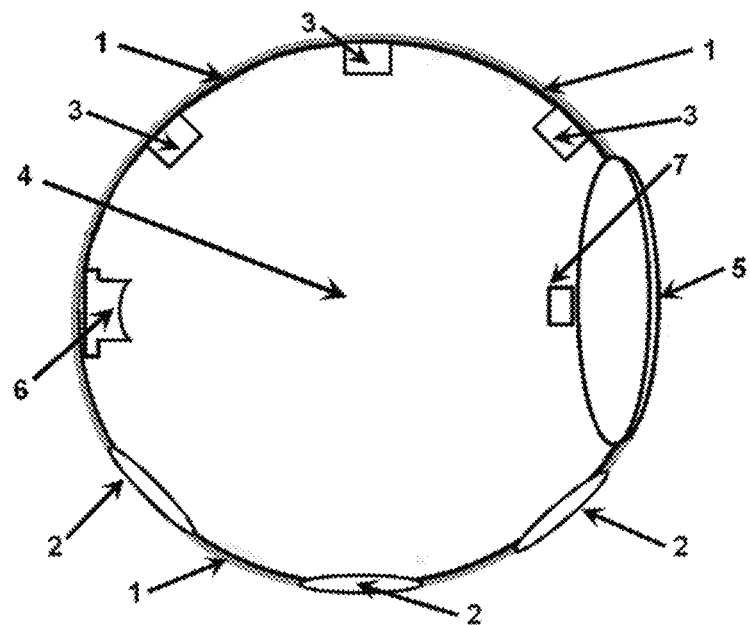
FIG. 1 is a depiction of a preferred embodiment of the present invention for a spherical space vehicle.

Describing the preferred embodiment of the present invention more specifically now with reference to the figures, FIG. 1 depicts the basic structure of the invention with embedded fiber optic gyroscopes (FOGs) and control moment gyroscopes (CMGs). The three FOG fiber coils each are wrapped within the same structure that contains the three relatively high-mass CMG wheels. As is well known in the art, FOG rotation rate measurements detect the optical path length difference of two counter-propagating optical signals, and is improved using a larger diameter D and longer length fiber coil l, where the rotation rate about the axis normal to the plane in which the fiber coil lies is expressed as:

$$\theta_R \sim \frac{\Delta\phi\lambda}{2\pi l D}$$

with the measured rotational rate being directly proportional to the optical path length difference $\Delta\Phi$ and wavelength $\lambda$. The faster the rotation, the larger the path length difference $\Delta\Phi$, and thus the more precise the rotation rate measurement $\theta_R$. Thus the preferred embodiment of the present invention, which places the FOG coils along the outer perimeter of the space vehicle, results in the best possible precision, and also provides an open inner volume for signal processing transmitters, receivers, optical imaging sensors, or other devices.

In operation of the FOGs, three separate rotation measurements are made via the three separate orthogonally configured Sagnac interferometers. The Sagnac interferometer is the well-known FOG interferometer that utilizes counter-propagating optical beams to measure an optical signal that is proportional to the optical phase difference (optical path difference) caused by rotation. This arrangement increases the sensitivity of the devices, since the coil diameter will be at a maximum in this configuration and the precision sensitivity of the detected rotation rate is inversely proportional to the coil diameter and fiber length. Additionally, a large diameter and longer fiber length can be spooled while keeping the thickness (volume) to a minimum.

The CMG wheel may reside within the outermost portion of the ring structure, or inside of the FOG coil, as depicted in FIGS. 5 and 7. Control moment gyroscopes typically use solid metal wheels with coupling elements in the center of the wheel along the axis of rotation; this connected coupling imparts the rotational torque onto the vehicle. The CMG of the preferred embodiment is designed as annular rings at the outer perimeter of the space vehicle coupled to the vehicle using various techniques including but not limited to low friction bearings, magnetic suspension, and other techniques. A precise value of coupling friction is desired such that the spinning wheel would impart the optimal value of torque onto the vehicle.

A variety of configurations for the apparatus can provide vehicle stabilization since the orientations of the rings can be configured in various ways. A basic orientation with the rings placed in three orthogonal planes as in the preferred embodiment of the present invention provides three rotational degrees of rotation. More complex configurations could include multiple CMG/FOG rings to provide enhanced precision in orientation and pointing. In alternative embodiments, two CMG rings could be placed in the same parallel plane of rotation, and spun up in opposite rotating directions, and a relative rotational speed between the two would vary the orientation of the vehicle, while stabilizing the vehicle. This configuration would have a similar effect as used for spin-stabilized satellites, which are spun about a relatively fixed axis for stabilization. However, the spinning CMGs would apply the stabilizing torque while the satellite overall vehicle attitude remains fixed. As is well known in the art, imparting a balanced overall torque to the vehicle keeps the attitude of the vehicle at a known fixed value.

The CMGs in the preferred embodiment function like those onboard space telescopes, and other momentum wheels in many other satellites, except that their mass is distributed about the diameter of the sphere, thereby providing the greatest amount of torque per unit mass. A desired result of this configuration is that the three CMGs are able to provide a full pointing capability for the vehicle with a minimum or no use of external correction thrusters.

Figure 2:
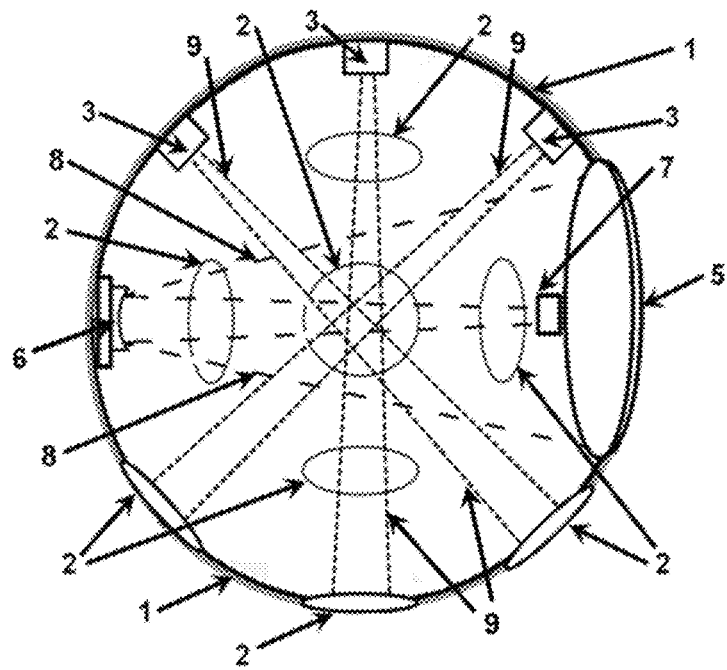
FIG. 2 is a depiction of a preferred embodiment of the present invention for a spherical space vehicle and the various signal apertures and the signal paths.

Referring now to FIG. 2, the space vehicle or satellite design is such that most of the inner volume of the satellite will be empty, with all the subsystems mounted to the inner surface panels. This provides at least two benefits. One, a large diameter system can be built that minimizes weight, and two, it provides for an open interior for the transfer of the free space optical communications (FSOC) beams and the imaging system's telescope. For both of these optical input/output signals, the entrance optical elements can be mounted in a panel directly opposite to its corresponding signal detection electronics. The focal plane optics and electronics will be contained in modules mounted to the opposite side from the telescope's input aperture, as depicted in FIGS. 1 and 2.

FIG. 1 depicts how the spherical space vehicle structure with circular rings 1 is ideal for interfacing with free space optical signals. Input and output beams enter and exit through the entrance/exit apertures 2 on one side of the sphere, with entrance/exit optical elements (optical filters, lenses) mounted to this entrance side. The electronics subsystems 3, such as a free space optical transceiver, is mounted on the opposing side (again, the inner surface), and plugged into the satellite's high-speed data handling network. The mechanical structure of the preferred embodiment accommodates multiple FSO input and output channels. Additionally, radio frequency (RF) signal apertures and antennas can also be utilized, depending on the implementation.

As depicted in FIGS. 1 and 2, the FOG coils and the CMGs are placed in close proximity to the outer perimeter of the space vehicle. Signal transmission and reception takes place through multiple apertures 2 that direct the incoming and outgoing signals to transmitting and receiving electronics 3 on the opposite side of the vehicle from the entrance/exit apertures 2. The inner volume of the space vehicle 4 is open allowing signal paths from various directions to freely traverse the inner volume and arriving at their respective electronics subsystems 3. Larger aperture imaging systems with longer focal length telescopes use an additional inner volume traversal by placing a concave reflecting mirror 6 at the opposing inner side of the vehicle where the light is then brought into focus at the center of the primary entrance lens aperture containing focal plane sensor electronics 7, as in Cassegrainian telescope configurations that are well known in the art of imaging systems.

Figure 3:
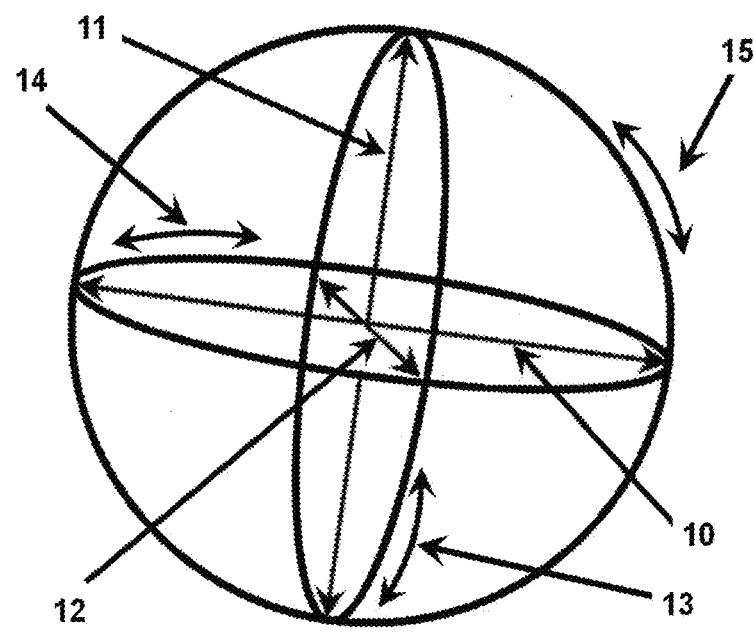
FIG. 3 is a depiction of orthogonal axes for a preferred embodiment of the present invention.

FIG. 2 also shows a side view with the cross-sectional views of additional signal apertures 2 and shows the outside edges with dashed lines 9 of an incoming or outgoing signal to and from the smaller apertures 2. The larger aperture input signals are illustrated with larger dashed lines 8. FIG. 3 shows a preferred embodiment defined three axis system defined by an X-axis 10, a Y axis 11, and a Z-axis 12. Each of these axes defines an orthogonal rotational plane. The rotational plane set by the X-axis defines angular rotations 13 about the X-axis; the Y-axis angle of rotation is 14, and the Z-axis rotational angle is 15.

Figure 4:
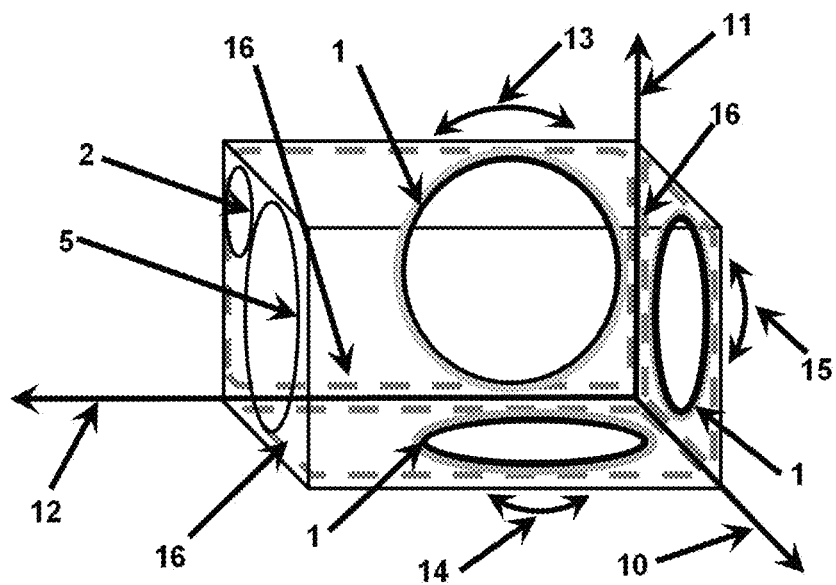
FIG. 4 is a depiction of an alternative preferred embodiment of the present invention for a rectangular space vehicle.

FIG. 4 depicts an alternative rectangular space vehicle preferred embodiment where the FOG/CMG rings 1 are placed into the outer perimeter and co-planar with the three outer walls of the vehicle. The inner volume is open for signal processing as in the previous spherical embodiment. The axes are defined similarly by an X-axis 10, a Y axis 11, and a Z-axis 12. Each of these axes defines an orthogonal rotational plane. The rotational plane set by the X-axis defines angular rotations 13 about the X-axis; the Y-axis angle of rotation is 14, and the Z-axis rotational angle is 15. The CMG/FOG rings 1 provide the rotational measurements and the torque control for inertial guidance and orientation.

FIG. 4 also shows alternative placements of the FOG coils into rectangular shapes in the orthogonal walls to the vehicle. The CMG heavy metal circular rings remain in the location as shown. However, the FOG coils can be wound into the outer corners 16 of each wall and provide a longer fiber length and a larger average effective diameter and thus more accurate rotational measurement sensitivities. This illustrates the flexibility of FOG coil placement; the shape can be square or rectangular as long as the fiber bend radius specification minimum is not compromised. Additionally, local twists and turns of the fiber coil are acceptable as well, since the FOG rotation measurement is based on the optical path length difference of two counter propagating beams.

Figures 5A, 5B:
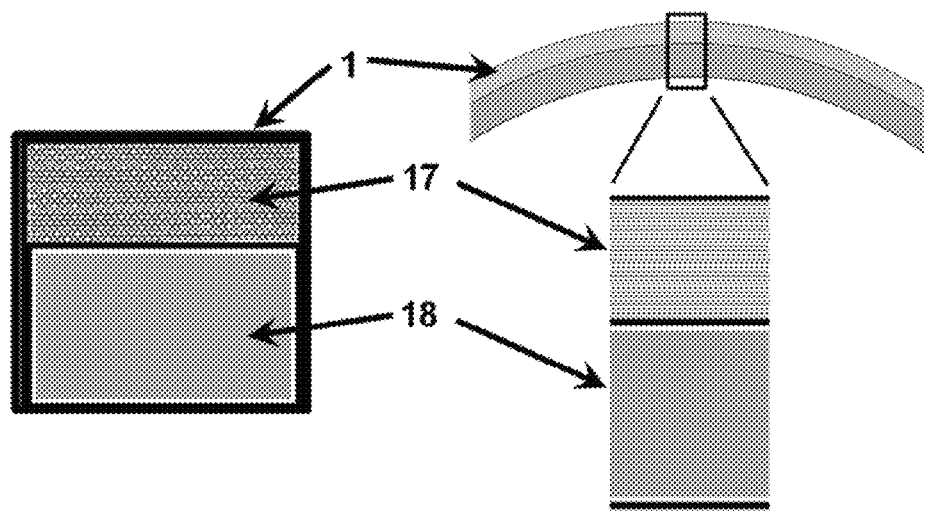
FIG. 5A depicts a cross sectional view of the FOG fiber coil and the adjacent CMG of a spherical preferred embodiment with rings.
FIG. 5B depicts the same elements from two side view perspectives; the top is a portion of the CMG/FOG ring and the bottom is a close up view from the side showing the fiber coil and CMG.

FIG. 5A depicts a front cross-sectional view of the CMG/FOG ring 1 with the optical fiber coil 17 placed at the outer perimeter of the ring and the CMG 18 just inside the fiber coil 17. FIG. 5B depicts a side view of the ring; the upper part of the figure shows a wider portion of the ring, while the bottom is an expanded close up view of the side of the ring with the fiber coil 17 on the top and the CMG 18 on the bottom.

Figure 6:
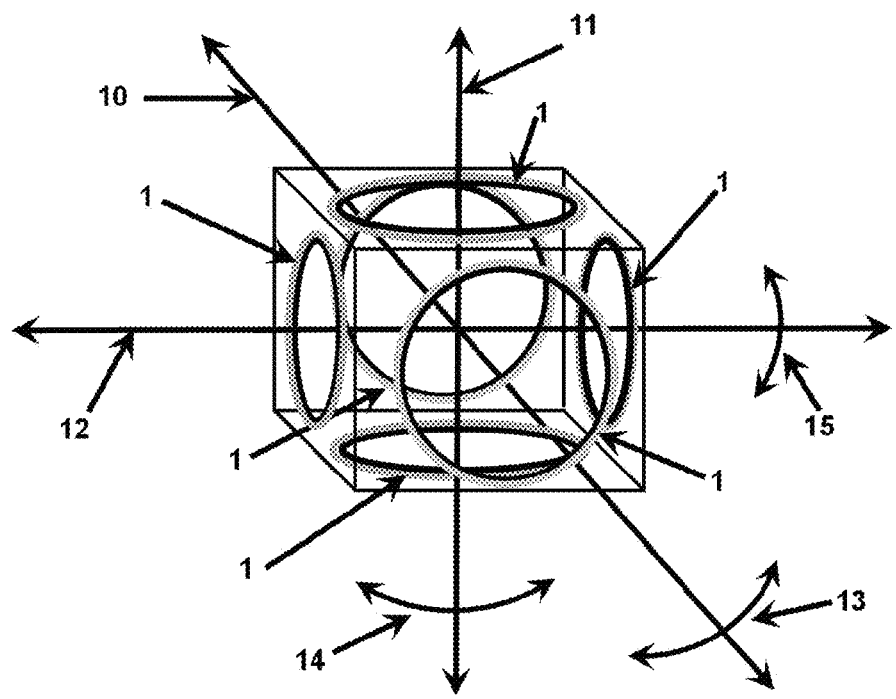
FIG. 6 is a depiction of an alternative preferred embodiment of the present invention for a rectangular space vehicle with FOG/CMG rings in all six outer walls of the vehicle.

FIG. 6 depicts a cube-shaped space vehicle according to an alternative embodiment with multiple CMG/FOG rings 1 lying in each of the six outer walls and co-planar with each wall. This provides vehicle stabilization about the vehicle's approximate center of mass and is able to maintain precise orientation using all six CMG/FOG rings 1. The axes are defined similarly by an X-axis 10, a Y axis 11, and a Z-axis 12. Each of these axes defines an orthogonal rotational plane. The rotational plane set by the X-axis defines angular rotation 13 about the X-axis; the Y-axis angle of rotation is 14, and the Z-axis rotational angle is 15.

Figures 7A, 7B:
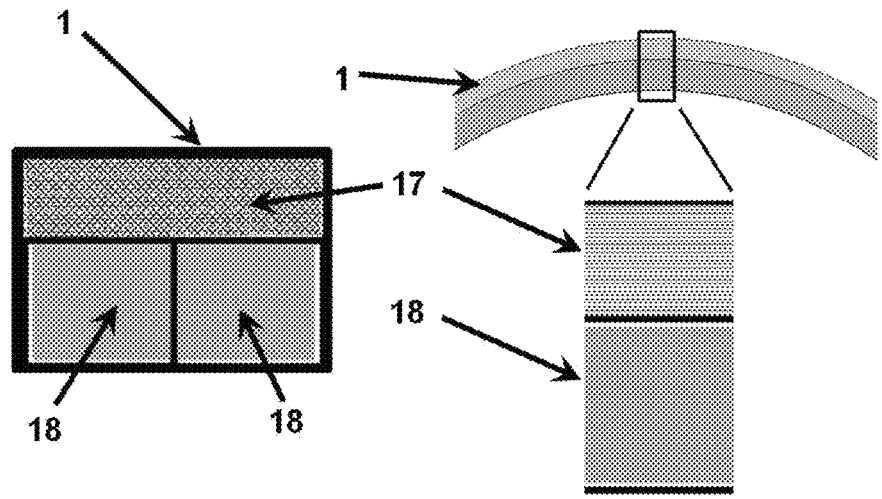
FIG. 7A depicts a cross sectional view of the FOG fiber coil and two counter-rotating CMGs contained in the same package.
FIG. 7B depicts the same elements from two side view perspectives; the top is a portion of the CMG/FOG ring and the bottom is a close up view from the side showing the fiber coil and the two CMGs.

FIGS. 7A and 7B depict an alternative embodiment for the CMG/FOG ring. FIG. 7A shows a front cross-sectional view of the CMG/FOG ring 1 with the optical fiber coil 17 placed at the outer perimeter of the ring. Two CMGs 18 share a common diameter but are offset for independent rotational torque on the vehicle adding enhanced precision orientation control and vehicle stabilization. The two CMGs 18 can be controlled at varying rotational velocities, and also be rotated in opposite rotational directions. FIG. 7B depicts a side view of ring 1; the upper part of the figure shows a wider portion of ring 1, while the bottom is an expanded close up view of the side of the ring with the fiber coil 17 on the top and the CMGs 18 on the bottom.

Figures 8A, 8B:
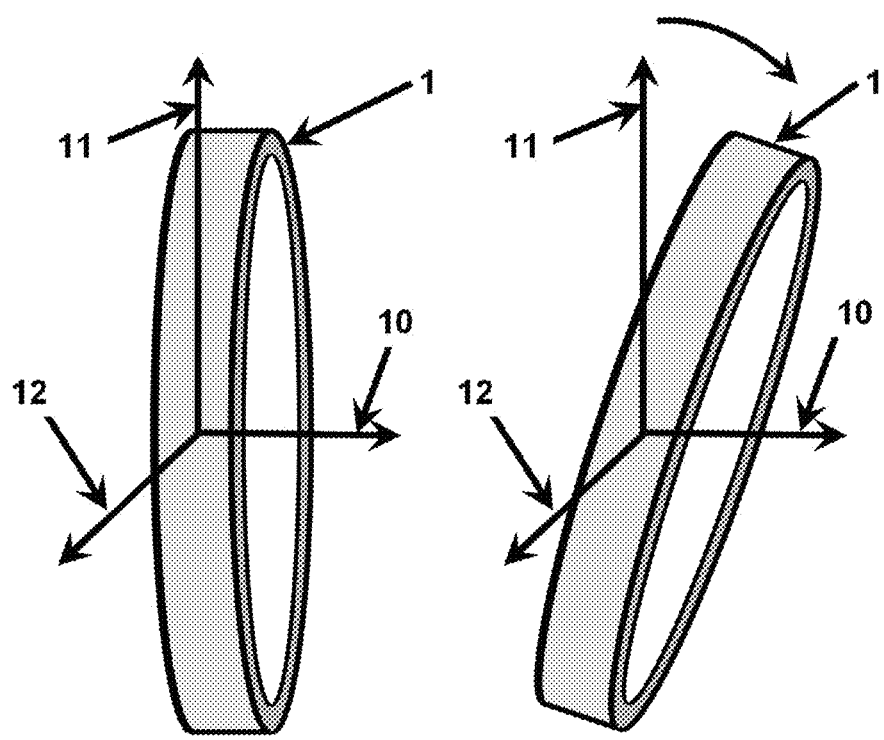
FIG. 8A depicts a single axis FOG/CMG apparatus.
FIG. 8B depicts the apparatus rotated out of its original plane of orientation. Rotating the apparatus out of its original plane of orientation provides precise vehicle rotation torque into the other orthogonal planes as is the common practice for CMG attitude control.

FIG. 8A and FIG. 8B depict a CMG/FOG ring 1. FIG. 8A shows the ring aligned with the X 10, Y 11, and Z 12 axes. FIG. 8B depicts the ring tilted out of the original plane, which imparts torque onto the vehicle in directions outside the original plane. This is the commonly-used vehicle attitude control approach that is well known in the art. The range of tilt for the foregoing preferred embodiments will use this technique only for very fine attitude adjustments, since each of our embodiments provide the majority of the stabilizing torque using their respective primary CMG/FOG rings 1.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention, as set forth in the appended claims.

The invention claimed is:

1. A space vehicle comprising:
    a. a vehicle frame comprising an outer perimeter;
    b. at least one fiber optic gyroscope (FOG) attached to the vehicle frame at the vehicle frame outer perimeter, wherein the FOG comprises a fiber optic coil wrapped along the vehicle frame outer perimeter;
    c. at least one circular annular ring control moment gyroscope (CMG) attached to the vehicle frame at the vehicle frame outer perimeter; and
    d. a vehicle body attached to the vehicle frame and defining within the vehicle body a substantially hollow interior comprising a plurality of signal paths.

2. The space vehicle of claim 1, wherein the fiber optic coil comprises a diameter approximately equal to a diameter of the vehicle frame outer perimeter.

3. The space vehicle of claim 1, further comprising a plurality of FOGs each comprising a fiber optic coil, wherein each of the plurality of fiber optic coils are positioned orthogonally with respect to each other.

4. The space vehicle of claim 3, further comprising a plurality of circular annular ring CMGs wherein each of the plurality of circular annular ring CMGs are mounted in conjunction and co-planar with one of the plurality of FOGs, and each of the plurality of CMGs comprise a disc oriented to rotate about an axis at the center of the circular annular ring CMG and normal to a plane occupied by the circular annular ring CMG.

5. The space vehicle of claim 4, wherein the vehicle comprises at least one optical lens at the vehicle frame outer perimeter and at least one optical receiver within the vehicle interior, and further wherein the vehicle interior comprises at least one unobstructed light path between the optical lens into the vehicle interior.

6. The space vehicle of claim 5, wherein the optical receiver is positioned at the vehicle outer perimeter opposite to and across the vehicle interior from the optical lens.

7. The space vehicle of claim 5, further comprising a mirror in the light path from the optical lens, wherein the receiver is positioned in a mirror path between the mirror and the optical lens in a Cassegrainian configuration.

8. The space vehicle of claim 4, wherein the space vehicle is spherical and the space vehicle frame comprises a plurality of support rings comprising the circular annular ring CMGs and the FOG fiber optic coils.

9. The space vehicle of claim 8, wherein each of the plurality of fiber optic coils is coiled along one of the plurality of support rings.

10. The space vehicle of claim 4, wherein the space vehicle comprises a plurality of flat sides, and wherein at least a subset of the plurality of flat sides comprise a support ring comprising the circular annular ring CMGs and the FOG fiber optic coils.

11. The space vehicle of claim 10, wherein at least one of the plurality of fiber optic coils is coiled at one of the plurality of flat sides along an outer rectangular perimeter of the flat sides.

12. A guidance and control system for a space vehicle comprising a hollow interior, the guidance and control system comprising:
    a. a first annular frame;
    b. a first fiber optic gyroscope (FOG) comprising a fiber optic coil attached at the first annular frame and coiling around the first annular frame; and
    c. a first control moment gyroscope (CMG) comprising a first rotating disc and attached at the first annular frame.

13. The guidance and control system of claim 12, wherein the first CMG is positioned at an interior position with respect to the first FOG.

14. The guidance and control system of claim 12, further comprising:
    a. a second annular frame orthogonal to the first annular frame;
    b. a second FOG comprising a fiber optic coil attached at the second annular frame and coiling around the second annular frame and orthogonal to the first FOG; and
    c. a second CMG comprising a second rotating disc and attached at the second annular frame, wherein the second rotating disc is aligned orthogonally to the first rotating disc.

15. The guidance and control system of claim 14, further comprising:
    a. a third annular frame orthogonal to both the first and second orthogonal frames;
    b. a third FOG comprising a fiber optic coil attached at the third annular frame and coiling around the third annular frame and orthogonal to both the first and second FOG; and
    c. a third CMG comprising a third rotating disc and attached at the second annular frame, wherein the third rotating disc is aligned orthogonally to the first and second discs.

16. The guidance and control system of claim 15, wherein the first, second, and third annular frame are positioned at a first, second, and third side of the space vehicle, respectively, and wherein the guidance and control system further comprises:
    a. a fourth annular frame at a fourth side parallel to the first annular frame at the first side, and orthogonal to both the second and third orthogonal frames at the second and third sides;
    b. a fourth FOG comprising a fiber optic coil attached at the fourth annular frame, lying in a plane parallel to the first FOG, coiling around the fourth annular frame or a perimeter of the fourth side, and orthogonal to both the second and third FOG; and
    c. a fourth CMG comprising a fourth rotating disc and attached at the fourth annular frame, wherein the fourth rotating disc is aligned parallel to the first rotating disc and orthogonal to the second and third discs.

17. The guidance and control system of claim 16, wherein the guidance and control system further comprises:

a. a fifth annular frame at a fifth side parallel to the second annular frame at the second side, and orthogonal to the first, third, and fourth orthogonal frames at the first, third, and fourth sides;
b. a fifth FOG comprising a fiber optic coil attached at the fifth annular frame, lying in a plane parallel to the second FOG, coiling around the fifth annular frame or a perimeter of the fifth side, and orthogonal to the first, third, and fourth FOG; and
c. a fifth CMG comprising a fifth rotating disc and attached at the fifth annular frame, wherein the fifth rotating disc is aligned parallel to the second rotating disc and orthogonal to the first, third, and fourth discs.

18. The guidance and control system of claim 17, wherein the guidance and control system further comprises:
a. a sixth annular frame at a sixth side parallel to the third annular frame at the third side, and orthogonal to the first, second, fourth, and fifth orthogonal frames at the first, second, fourth, and fifth sides;
b. a sixth FOG comprising a fiber optic coil attached at the sixth annular frame, lying in a plane parallel to the third FOG, coiling around the sixth annular frame or a perimeter of the sixth side, and orthogonal to the first, second, fourth, and fifth FOG; and
c. a sixth CMG comprising a sixth rotating disc and attached at the sixth annular frame, wherein the sixth rotating disc is aligned parallel to the third rotating disc and orthogonal to the first, second, fourth, and fifth discs.

* * * * *